United States Patent
Nagata et al.

(10) Patent No.: US 9,337,975 B2
(45) Date of Patent: May 10, 2016

(54) RADIO COMMUNICATION SYSTEM, RADIO COMMUNICATION METHOD, RADIO BASE STATION APPARATUS AND USER TERMINAL

(71) Applicant: NTT DOCOMO, INC., Tokyo (JP)

(72) Inventors: Satoshi Nagata, Tokyo (JP); Yoshihisa Kishiyama, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 80 days.

(21) Appl. No.: 14/355,337

(22) PCT Filed: Nov. 9, 2012

(86) PCT No.: PCT/JP2012/079089
§ 371 (c)(1),
(2) Date: Apr. 30, 2014

(87) PCT Pub. No.: WO2013/069759
PCT Pub. Date: May 16, 2013

(65) Prior Publication Data
US 2014/0307688 A1    Oct. 16, 2014

(30) Foreign Application Priority Data
Nov. 11, 2011 (JP) ................................ 2011-247490

(51) Int. Cl.
*H04W 88/06* (2009.01)
*H04L 5/00* (2006.01)
*H04L 1/18* (2006.01)
*H04W 88/08* (2009.01)

(52) U.S. Cl.
CPC ............ *H04L 5/0035* (2013.01); *H04L 1/1854* (2013.01); *H04L 5/001* (2013.01); *H04L 5/0055* (2013.01); *H04W 88/085* (2013.01)

(58) Field of Classification Search
None
See application file for complete search history.

(56) References Cited

U.S. PATENT DOCUMENTS

| | | | |
|---|---|---|---|
| 2010/0331037 A1* | 12/2010 | Jen ................................. | 455/522 |
| 2013/0128854 A1* | 5/2013 | Nakashima et al. .......... | 370/329 |
| 2014/0198761 A1* | 7/2014 | Hooli et al. .................. | 370/329 |
| 2014/0226609 A1* | 8/2014 | Hooli et al. .................. | 370/329 |

OTHER PUBLICATIONS

International Search Report for corresponding International Application No. PCT/JP2012/079089, mailed Dec. 18, 2012 (1 page).
(Continued)

*Primary Examiner* — Chi H Pham
*Assistant Examiner* — Shick Hom
(74) *Attorney, Agent, or Firm* — Osha Liang LLP (57) ABSTRACT

The present invention is designed to effectively apply carrier aggregation and Coordinated Multiple Point (CoMP) transmission/reception in a system band that is formed with a plurality of fundamental frequency blocks. A radio communication system where carrier aggregation is applicable in the same frequency band, and, this radio communication system includes the first radio base station apparatus and a second radio base station apparatus that perform coordinated multiple point transmission to a user terminal using cells having the same frequency band, and the first radio base station apparatus and the second radio base station apparatus perform retransmission control for uplink signals from the user terminal on a shared basis, and perform mapping of downlink signals to radio resources separately.

7 Claims, 11 Drawing Sheets

(56) References Cited

OTHER PUBLICATIONS

3GPP TR25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN) (Release 7);" Sep. 2006 (57 pages).

* cited by examiner

FIG. 11

RADIO COMMUNICATION SYSTEM, RADIO COMMUNICATION METHOD, RADIO BASE STATION APPARATUS AND USER TERMINAL

TECHNICAL FIELD

The present invention relates to a radio communication system, a radio communication method, a radio base station apparatus and a user terminal. More particularly, the present invention relates to a radio communication system, a radio communication method, a radio base station apparatus and a user terminal that perform coordinated multiple point (CoMP) transmission/reception in a system band that is formed by aggregating a plurality of fundamental frequency blocks.

BACKGROUND ART

In the UMTS (Universal Mobile Telecommunications System) network, for the purposes of improving spectral efficiency and improving the data rate, system features based on W-CDMA (Wideband Code Division Multiple Access) are maximized by adopting HSDPA (High Speed Downlink Packet Access) and HSDPA (High Speed Uplink Packet Access). For this UMTS network, for the purposes of further increasing high-speed data rates, providing low delay and so on, long-term evolution (LTE) has been under study (non-patent literature 1).

In the third-generation system, it is possible to achieve a transmission rate of maximum approximately 2 Mbps on the downlink by using a fixed band of approximately 5 MHz. Meanwhile, in a system of the LTE scheme, it is possible to achieve a transmission rate of about maximum 300 Mbps on the downlink and about 75 Mbps on the uplink by using a variable band that ranges from 1.4 MHz to 20 MHz. Furthermore, in the UMTS network, for the purpose of achieving further broadbandization and higher speed, successor systems of LTE have been under study (for example, LTE-Advanced (LTE-A)).

CITATION LIST

Non-Patent Literature

Non-Patent Literature 1: 3GPP, TR25.912 (V7.1.0), "Feasibility Study for Evolved UTRA and UTRAN," September 2006

SUMMARY OF THE INVENTION

Technical Problem

In the LTE-A system, carrier aggregation (CA: Carrier Aggregation) to achieve broadbandization by aggregating a plurality of fundamental frequency blocks (CCs: Component Carriers) of different frequency bands is under study. Also, in the LTE-A system, to realize broadbandization while maintaining backward compatibility with the LTE system, there is an agreement to make a single fundamental frequency block a frequency band (for example, 20 MHz) that can be used in the LTE system. For example, when five fundamental frequency blocks are aggregated, the system band becomes 100 MHz.

Now, in the LTE system (Rel-8), as a technique for further improving the system performance, there is inter-cell orthogonalization. In the LTE-A system (Rel-10), intra-cell orthogonalization is made possible by orthogonal multiple access on both the uplink and the downlink. That is to say, on the downlink, orthogonalization is provided between user terminals (user equipments) in the frequency domain. However, between cells, like in W-CDMA, interference randomization by repeating one-cell frequency is fundamental.

Also, in the 3GPP (3rd Generation Partnership Project), coordinated multiple-point transmission/reception (CoMP) is under study as a technique for realizing inter-cell orthogonalization. With the CoMP technique, a plurality of cells coordinate and perform signal processing for transmission and reception for one user terminal (UE) or for a plurality of user terminals (UEs). Furthermore, for a future radio communication system, applying a combination of the CoMP technique and carrier aggregation is under study. In this case, how to apply the mechanism of carrier aggregation to CoMP is the problem.

The present invention has been made in view of the above, and it is therefore an object of the present invention to provide a radio communication system, a radio communication method, a radio base station apparatus and a user terminal that can effectively combine and apply carrier aggregation and the CoMP technique in a system band that is formed with a plurality of fundamental frequency blocks.

Solution to Problem

A radio communication system according to the present invention is a radio communication system where carrier aggregation is applicable in a same frequency band, and this radio communication system has: a first radio base station apparatus and a second radio base station apparatus that perform coordinated multiple point transmission to a user terminal using cells of the same frequency band, and the first radio base station apparatus and the second radio base station apparatus execute retransmission control for uplink signals from the user terminal on a shared basis, and execute mapping of downlink signals to radio resources separately.

A radio communication method according to the present invention is a radio communication method in a radio communication system where carrier aggregation is applicable in a same frequency band, and this radio communication method includes the steps in which: a first radio base station apparatus and a second radio base station apparatus perform coordinated multiple point transmission to a user terminal using cells of the same frequency band; and the user terminal receives downlink signals from the first radio base station apparatus and the second radio base station apparatus, and the first radio base station apparatus and the second radio base station apparatus execute retransmission control for uplink signals from the user terminal on a shared basis, and execute mapping of downlink signals to radio resources separately.

A radio base station apparatus according to the present invention is a radio base station apparatus that performs radio communication with a user terminal in a radio communication system where carrier aggregation is applicable in a same frequency band, and this radio base station apparatus has: a transmission control section configured to perform coordinated multiple point transmission with another radio base station apparatus to a user terminal, using cells having a same frequency band; a retransmission control section configured to control retransmission acknowledgement in response to uplink signals from the user terminal; and a mapping section configured to map downlink signals, to radio resources, to transmit to the user terminal, and the retransmission control section is provided to be shared with the other radio base station apparatus, and the mapping section is provided separately from the other radio base station apparatus.

A user terminal according to the present invention is a user terminal that performs radio communication with a plurality of radio base station apparatuses in a radio communication system where carrier aggregation is applicable in a same frequency band, and this user terminal has: a reception control section configured to receive downlink signals that are given by coordinated multiple point transmission using cells of the plurality of radio base station apparatuses having a same frequency band; and a transmission control section configured to transmit received quality information, and the downlink signals include a retransmission control signal and downlink control signals, the retransmission control signal being generated in the plurality of radio base station apparatuses on a shared basis, and the downlink control signals being generated separately in each of the plurality of radio base stations.

Technical Advantage of the Invention

According to the present invention, it is possible to effectively combine and apply carrier aggregation and the CoMP technique in a system band that is formed with a plurality of fundamental frequency blocks.

DESCRIPTION OF EMBODIMENTS

Figure 1A:
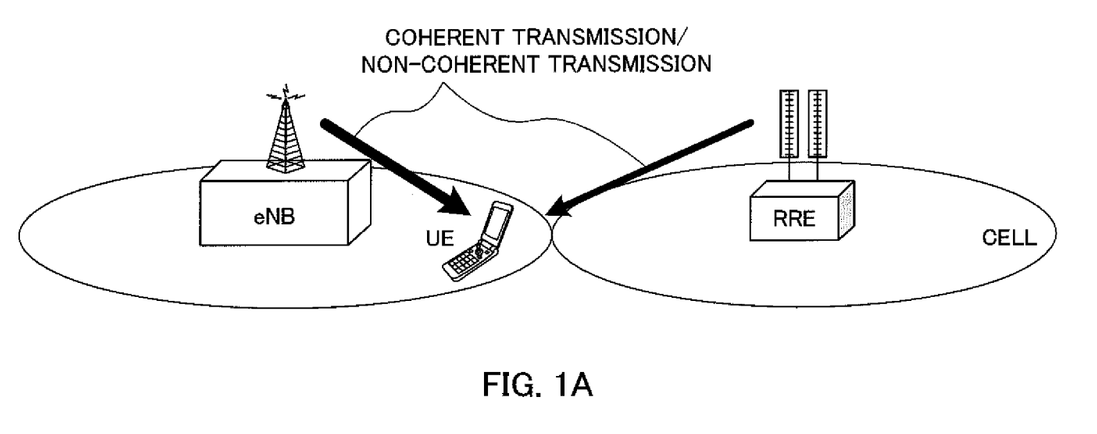
FIG. 1 provides diagrams to explain coordinated multiple points.
Figure 1B:
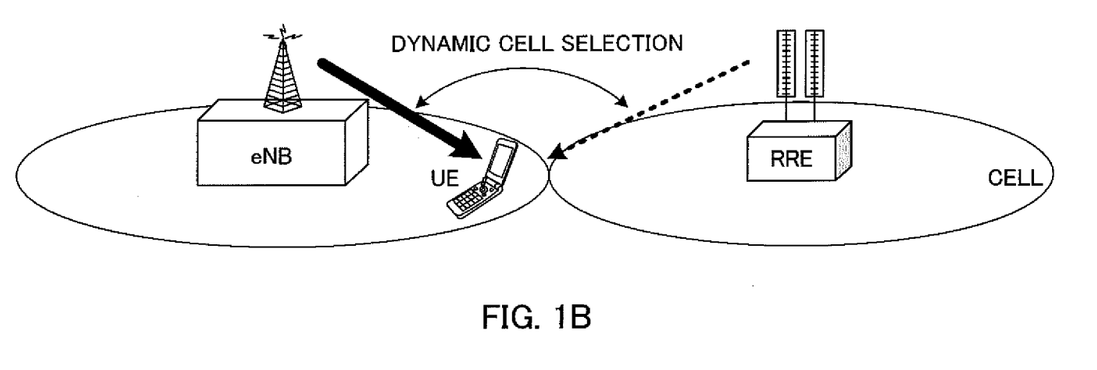

Now, embodiments of the present invention will be described below in detail with reference to the accompanying drawings. First, downlink CoMP transmission will be described. Downlink CoMP transmission includes coordinated scheduling/coordinated beamforming, and joint processing. Coordinated scheduling/coordinated beamforming refers to a method of transmitting from only one cell to one UE, and allocates radio resources in the frequency/space domain, taking into account interference from other cells and interference against other cells. On the other hand, joint processing refers to a method of simultaneously transmitting from a plurality of cells adopting precoding, and includes joint transmission (JT) to transmit from a plurality of cells to one UE, as shown in FIG. 1A, and dynamic point selection (DPS) to select cells dynamically, as shown in FIG. 1B.

Figure 2A:
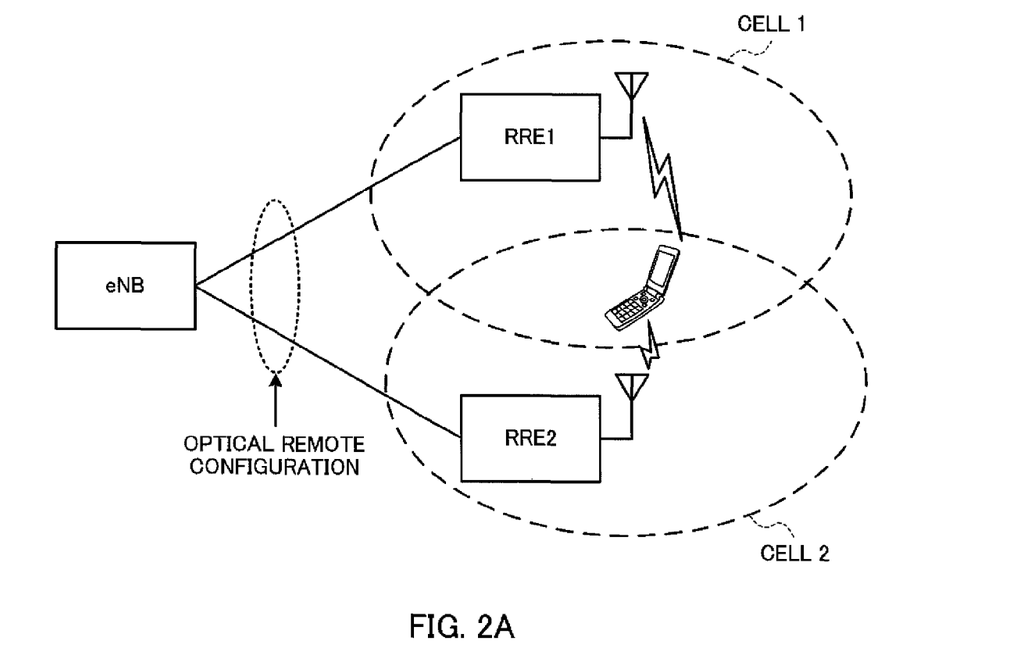
FIG. 2 provides diagrams to explain configurations of radio base station apparatuses.
Figure 2B:
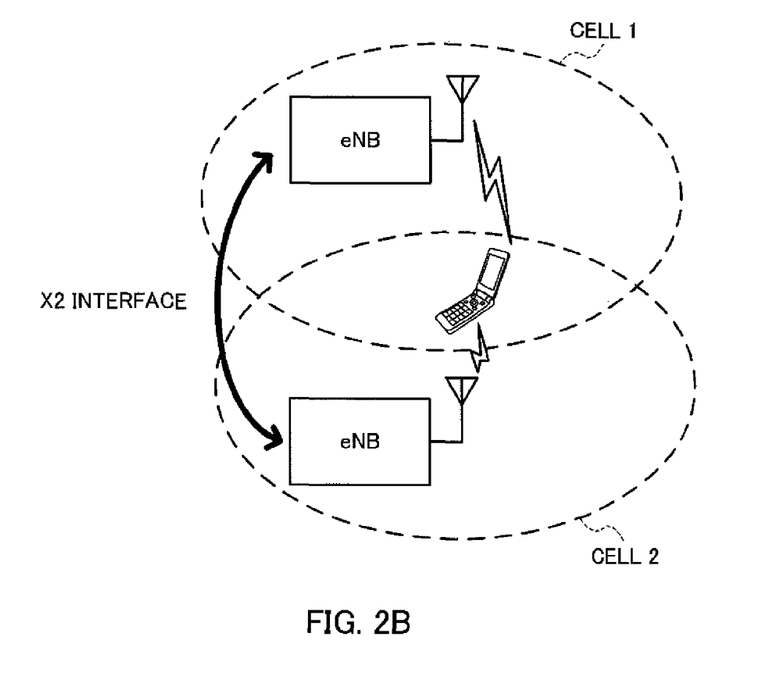

As a configuration to realize CoMP transmission/reception, the cases shown in FIGS. 2A and 2B may be possible. FIG. 2A shows a configuration (centralized control based on a remote radio equipment configuration) to include a radio base station apparatus eNB and a plurality of remote radio equipment (RREs) that are connected with the radio base station apparatus eNB by an optical remote configuration (optical fiber). FIG. 2B shows configurations (autonomous distributed control based on an independent base station configuration) of radio base station apparatus eNBs. The radio communication system according to the present embodiment is applicable in either of the above configurations.

In the configuration shown in FIG. 2A (RRE configuration), remote radio equipment RRE 1 and RRE 2 are controlled in a centralized fashion in a radio base station apparatus eNB. In the RRE configuration, a radio base station apparatus eNB (central base station) that performs baseband signal processing and control for a plurality of RREs, and each cell (RRE) are connected by baseband signals using optical fiber. Consequently, it is possible to execute radio resource control between cells in the central base station altogether. That is, the problems of signaling delay and overhead between radio base station apparatuses, which become problems in an independent base station configuration, are insignificant, and high-speed radio resource control between cells is relatively easy. Consequently, in the RRE configuration, on the downlink, it is suitable for adopting a method to use fast signal processing between cells such as simultaneous transmission of a plurality of cells.

On the other hand, in the configuration shown in FIG. 2B, a plurality of radio base station apparatus eNBs (or RREs) each perform radio resource allocation control such as scheduling. In this case, by using the X2 interface between the radio base station apparatus eNB of cell 1 and the radio base station apparatus eNB of cell 2, radio resource allocation information such as timing information and scheduling is transmitted to one of the radio base station apparatuses when necessary, thereby coordinating between the cells.

Next, carrier aggregation to form a system band by aggregating a plurality of fundamental frequency blocks will be described.

Figure 3:
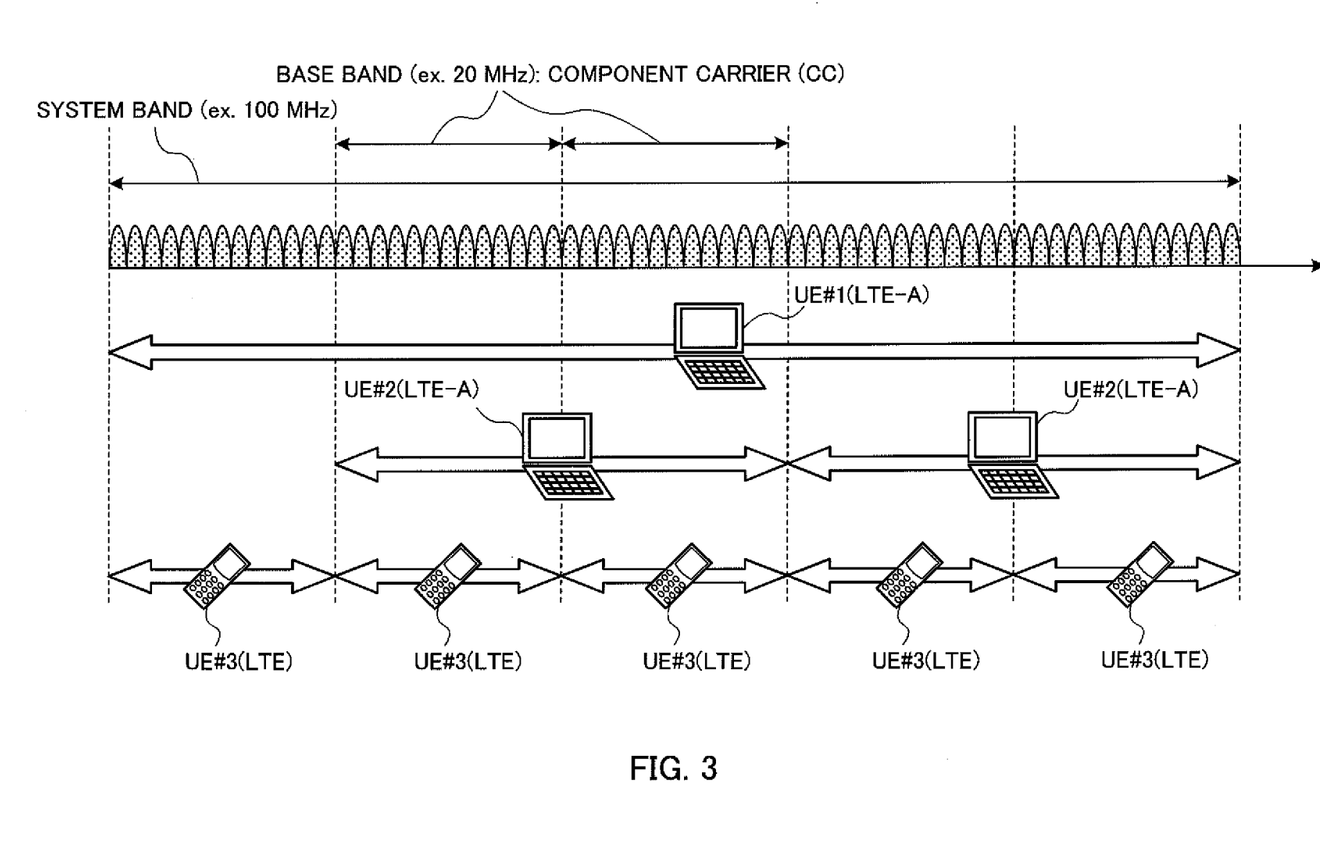
FIG. 3 is a diagram to show a layered bandwidth configuration defined in LTE-A.

FIG. 3 is a diagram to show a layered bandwidth configuration defined in LTE-A (Rel-10). The example shown in FIG. 3 illustrates a case where an LTE system to perform radio communication using a variable system band and an LTE-A system to perform radio communication using a variable system band that is formed by using the system band of the LTE system (for example, the maximum system band) as the base unit (fundamental frequency block) coexist. In the LTE-A system, the system band is switched by adding or removing fundamental frequency blocks.

For example, as shown in FIG. 3, the system band of the LTE-A system constituted by a system band (20 MHz×5=100 MHz) to include bands of five CCs, where the system band of the LTE system (base band: 20 MHz) is one CC. In FIG. 3, user terminal UE #1 is a user terminal to support the LTE-A system (and also support the LTE system), and is able to support a system band up to 100 MHz. UE #2 is a user terminal to support the LTE-A system (and also support the LTE system), and is able to support a system band up to 40

MHz (20 MHz×2=40 MHz). UE #3 is a user terminal to support the LTE system (and not support the LTE-A system), and is able to support a system band up to 20 MHz (base band).

Figure 4:
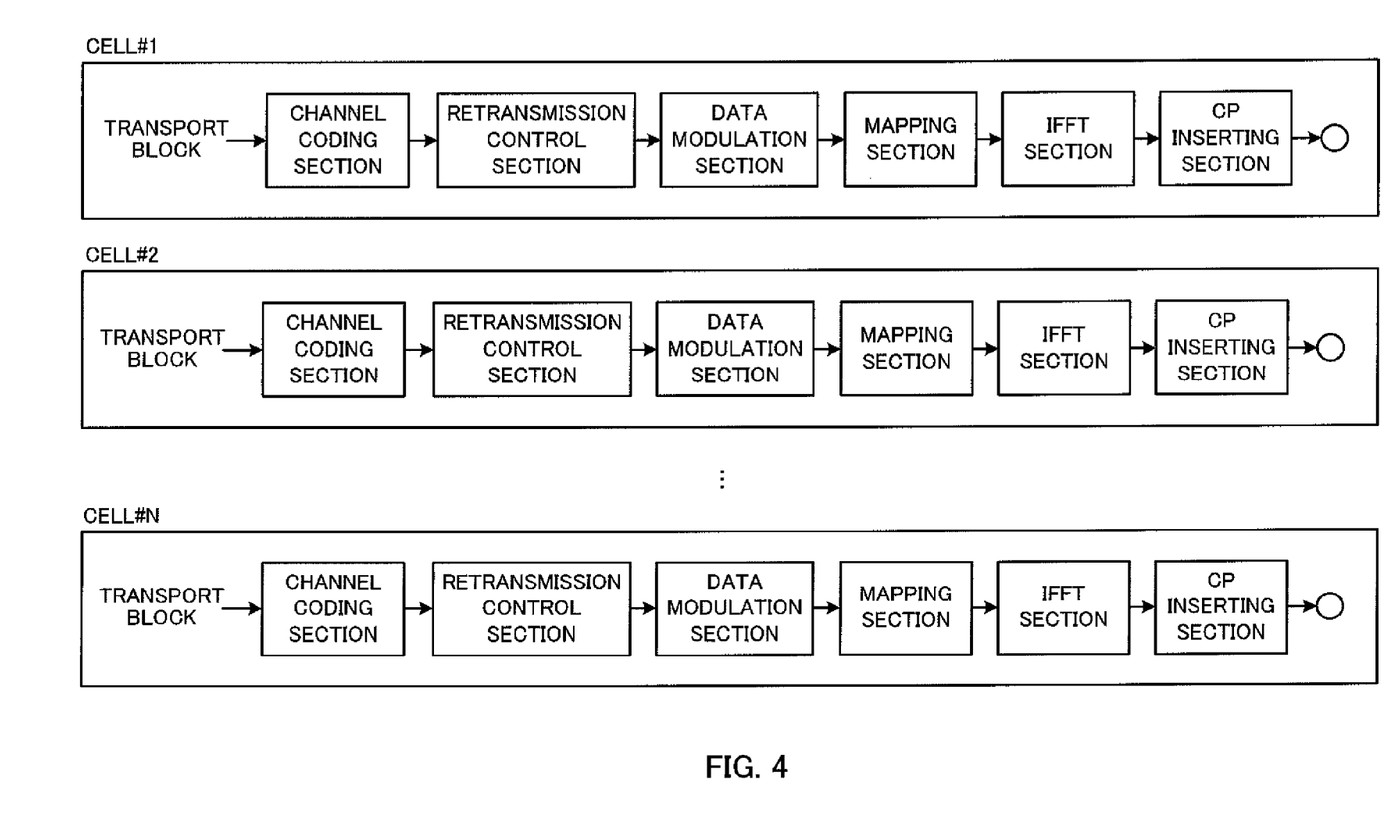
FIG. 4 is a diagram to explain a transmission processing section in each cell in carrier aggregation.

Also, the carrier aggregation in LTE-A (Rel-10) is defined to associate transport blocks (TBs), which are the unit of coding/retransmission, on a one-by-one basis, for each of a plurality of cells. Consequently, when transmission is executed, by adopting carrier aggregation, from a plurality of cells to a user terminal, performing transmission processes on a per cell basis is defined, as shown in FIG. 4. FIG. 4 shows a case where each process, such as channel coding, retransmission control, data modulation, mapping, an inverse fast Fourier transform (IFFT), and CP (Cyclic Prefix) insertion, is performed, separately, on a per cell basis (cell #1 to cell #N).

Now, in the above-described LTE-A system (Rel-10), only carrier aggregation to use CCs of different frequency bands is defined. However, in future radio communication systems, combining and applying the above-described CoMP technique and carrier aggregation is under study. In this case, carrier aggregation is allowed in the same frequency band, and applying the CoMP technique to use the mechanism of carrier aggregation may be possible.

Figure 5A:
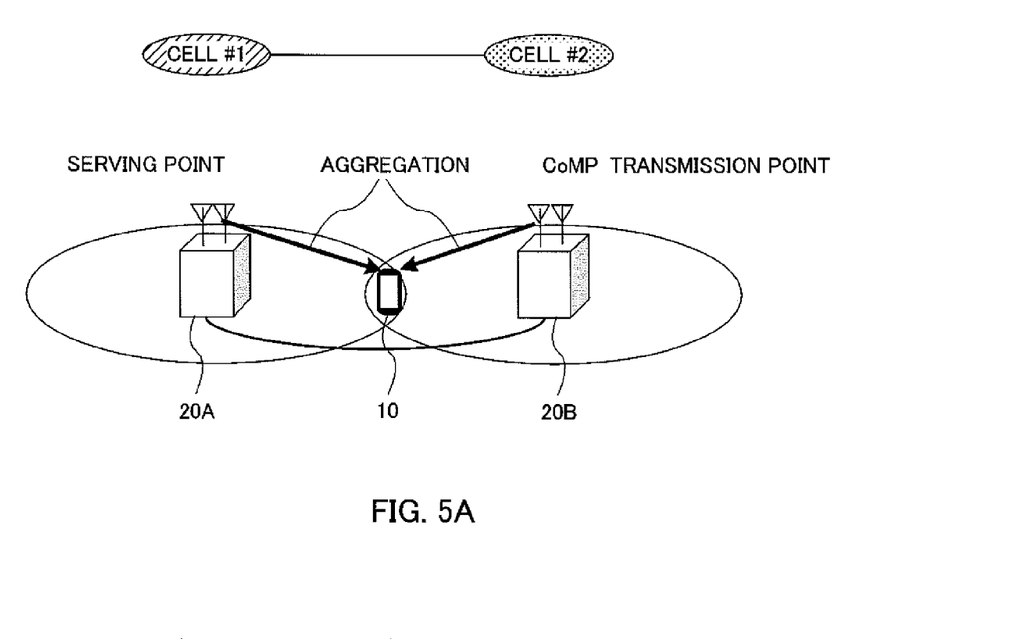
FIG. 5 provides diagrams to show an example of a configuration of a radio communication system according to the present embodiment.
Figure 5B:
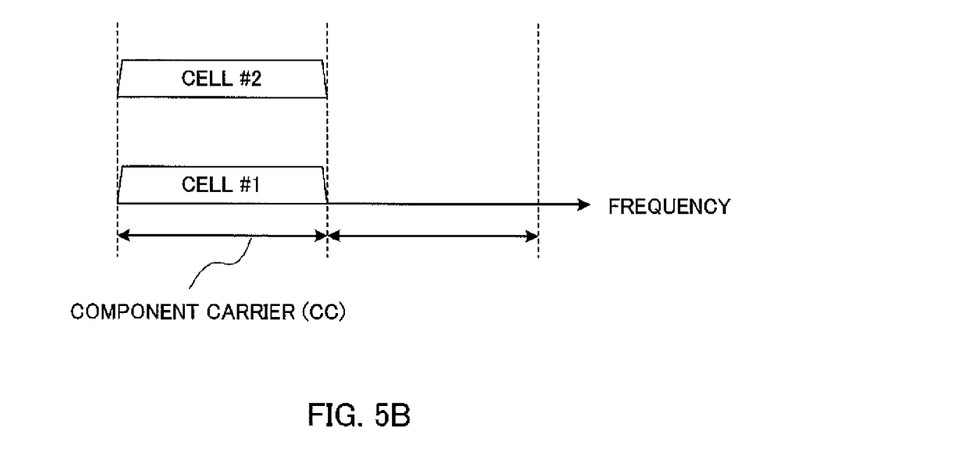

FIG. 5A illustrates a case where the first radio base station apparatus 20A and a second radio base station apparatus 20B execute CoMP transmission (for example, DPS) to a user terminal 10, using cell #1 and cell #2, respectively. Also, in this case, cell #1 and cell #2 both correspond to CCs of the same frequency band (see FIG. 5B), and carrier aggregation is adopted in cell #1 and cell #2. For example, assuming that the cell (cell #1) of the first radio base station apparatus is the primary cell (Pcell) and the cell (cell #2) of the second radio base station apparatus is a secondary cell (Scell), the carrier aggregation defined in LTE-A (Rel-10) may be applied.

However, in this case, the following problem might occur if the transmission processes in each cell (cell #1 and cell #2) are performed separately on a per cell basis as shown in above FIG. 4.

For example, when, in a given time interval during CoMP transmission (for example, DPS), the first radio base station apparatus 20A performs data transmission with the user terminal 10 in cell #1, the first radio base station apparatus 20A (cell #1) generates a retransmission control signal in response to an uplink signal transmitted from the user terminal 10. The retransmission control signal generated in the first radio base station apparatus 20A is fed back to the user terminal 10, and the user terminal 10 performs uplink signal retransmission control based on the retransmission control signal that is received.

However, if, before the retransmission control signal is fed back, the cell to communicate with the user terminal 10 switches from cell #1 to cell #2 depending on the communication environment, the second radio base station apparatus 10B starts communicating with the user terminal 10 in cell #2. In this case, the communication between the first radio base station apparatus 20A (cell #1) and the user terminal 10 ceases, and the retransmission control signal generated in the first radio base station apparatus 20A is no longer fed back to the user terminal 10 (or delayed). As a result of this, communication error and/or communication delay may be produced.

The present inventors have found out that a problem occurs when the mechanism of carrier aggregation is applied to CoMP as is in a radio communication system where carrier aggregation is allowed in the same frequency band. Then, as a result of studying the means to solve this problem, the present inventors have arrived at the present invention upon conceiving of making part of the transmission processes shared between a plurality of cells, with respect to cells of the same frequency, and executing the rest of the transmission processes separately on a per cell basis. Now, embodiments will be described below in detail.

Figure 6A:
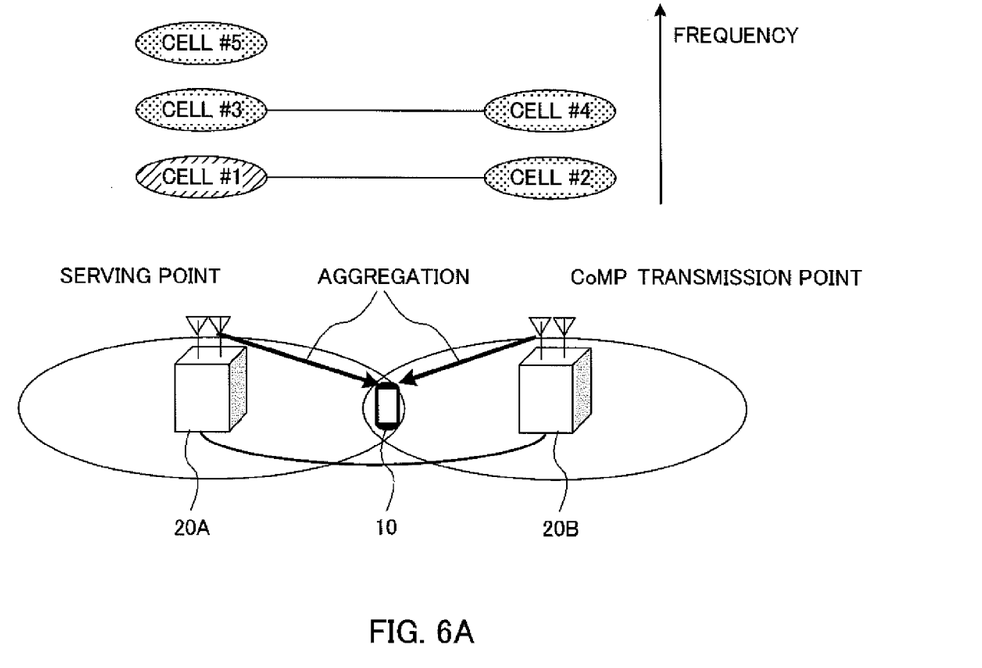
FIG. 6 provides diagrams to show an example of a configuration of a radio communication system according to the present embodiment.
Figure 6B:
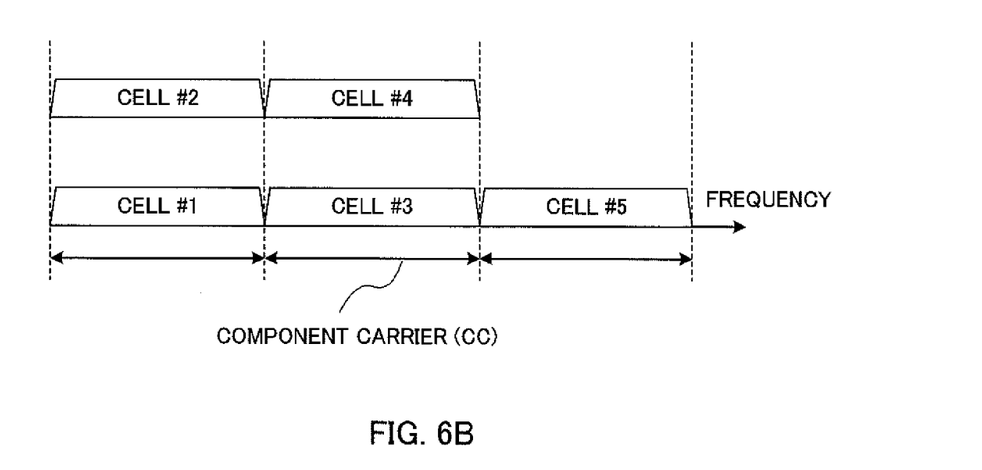

FIG. 6 provides diagrams to explain an example of a radio communication system according to the present embodiment. FIG. 6A shows a case where the first radio base station apparatus 20A and the second radio base station apparatus 20B perform data transmission to a user terminal 10, from a plurality of cells, in fundamental frequency block units. FIG. 6B shows the relationship of frequency bands corresponding to a plurality of cells where carrier aggregation is applied.

FIG. 6 shows a case where the first radio base station apparatus 20A communicates with the user terminal 10 using a plurality of cells (three cells, namely cell #1, cell #3 and cell #5) of different frequency bands. Also, a case is shown where the second radio base station apparatus 20B communicates with the user terminal 10 using a plurality of cells (two cells, namely cell #2 and cell #4) of different frequency bands. For example, assuming that cell #1 is the primary cell (Pcell) and the other cells (cell #2 to cell #5) are secondary cells (Scells), carrier aggregation is applied. The Pcell is one that is selected from a plurality of cells.

Also, the first radio base station apparatus 20A and the second radio base station apparatus 20B perform coordinated multiple point transmission to the user terminal 10 using cells (in FIG. 6, using cell #1 and cell #2, and/or using cell #3 and cell #4) of the same frequency band. By this means, even when the user terminal 10 is located on a cell edge, it is possible to improve the received quality in the user terminal 10.

The user terminal 10 receives downlink signals, from the first radio base station apparatus 20A and the second radio base station apparatus 20B, in a plurality of cells (cell #1 to cell #5). That is, a case is shown with the radio communication system of FIG. 6 where a plurality of cells are combined and selected (cell aggregation), carrier aggregation is allowed in the same frequency band, and also the CoMP technique is applied.

Also, with the present embodiment, at least retransmission control is executed on a shared basis between cells corresponding to the same frequency band (in FIG. 6, between cell #1 and cell #2, and between cell #3 and cell #4), and mapping of downlink control signal and so on is controlled separately, on a per cell basis. For example, when the first radio base station apparatus 20A and the second radio base station apparatus 20B both have processing sections to control the transmission processes for cell #1 and cell #2, the first radio base station apparatus 20A and the second radio base station apparatus 20B share a retransmission control section 22 to generate retransmission acknowledgement signals. Meanwhile, a configuration is used in which a mapping section 26 to map downlink signals such as downlink control signals, downlink data signals, reference signals and so on to radio resources, is provided separately on a per cell basis (see FIG. 7).

Figure 7:
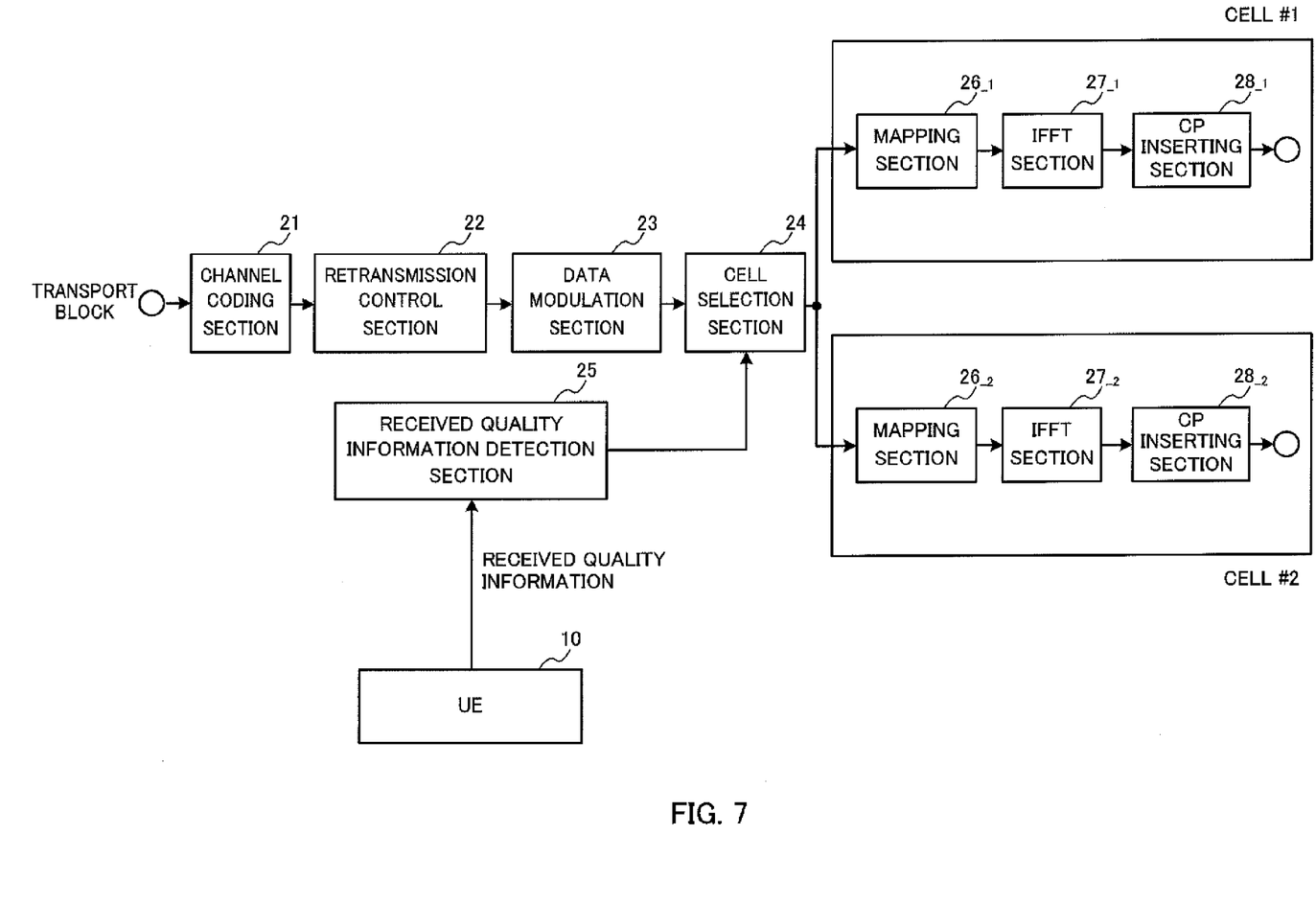
FIG. 7 is a diagram to explain a transmission processing section in each cell according to the present embodiment.

By sharing the retransmission control section 22 between cells corresponding to the same frequency band, it becomes possible to transmit retransmission control signals generated in the retransmission control section 22 from either of the cell (cell #1) of the first radio base station apparatus 20A and the cell (cell #2) of the second radio base station apparatus 20B. By this means, upon CoMP transmission, even when the cell to communicate with the user terminal 10 changes, it is still possible to feed back the retransmission control signals to the user terminal 10 without delay.

Also, with the present embodiment, not all transmission processes are shared between different cells, and configurations to require different processes on a per cell basis, such as the mapping section 26 to perform mapping of downlink control signals, are provided separately on a per cell basis.

Examples of signals to be multiplexed in the mapping section 26 include data signals (PDSCH (Physical Downlink Shared Channel)), the PDCCH signal to report allocation information with regard to the PDSCH, the PUSCH (Physical Uplink Shared Channel) and so on, control signals such as the PCFICH (Physical Control Format Indicator Channel) to report the CFI (Control channel Format Indicator) value, that is the number of downlink control channel symbols, to realize highly efficient transmission, the PHICH (Physical Hybrid ARQ Indicator Channel) to report ACK/NACK information in response to the uplink, and so on, and reference signals such as the CRS, the DM-RS (Demodulation Reference Signal), the CSI-RS (Channel State Information Reference Signal), and so on.

The downlink control signals (for example, the PDCCH signal) are mapped to radio resources and transmitted, and are allocated to the first to third OFDM symbols of a subframe, depending on the communication environment. Also, in the first to third OFDM symbols of a subframe, cell-specific reference signals (the CRS-RS and so on) are arranged. Consequently, the mapping positions of downlink control signals change, on a per subframe basis, depending on the communication environment, and vary on a per cell basis. Also, as for the reference signals, the CRS, the DM-RS, the CSI-RS and so on, which are cell-specific reference signals, are multiplexed in a subframe. For example, as for the CRS, the multiplexing positions of the CRSs are determined by the cell ID (Identification), and there is a possibility that different multiplexing positions may be provided on a per cell basis. Consequently, the first radio base station apparatus 20A and the second radio base station apparatus 20B provide mapping sections separately, on a per cell basis, and control them in cell units.

Note that, although the retransmission control section 22 and the mapping section 26 have been described in the above description, it is also possible to provide a configuration to execute processes on a shared basis between cells of the same frequency band, with respect to the transport block, the channel coding section 21, the data modulation section 23 and so on, as shown in FIG. 7. Meanwhile, it is also possible to provide a configuration in which an IFFT section 27 to perform an IFFT, which is a process after mapping, and a CP inserting section 28 to add CPs are provided separately on a per cell basis.

A configuration to provide the transmission processing sections to be shared between cells (for example, the retransmission control section 22, the transport block, the channel coding section 21, the data modulation section 23 and so on) in only one of the first radio base station apparatus 20A (cell #1) and the second radio base station apparatus 20B (cell #2), or a configuration to provide these transmission processing sections in both may be possible. When the retransmission control section 22 and so on are provided in both radio base station apparatuses, a configuration to control the processes alone on a shared basis between different cells may be used.

Also, when the dynamic cell selection method (DPS) is adopted as coordinated multiple point transmission, the first radio base station apparatus 20A or the second radio base station apparatus 20B executes mapping to a predetermined cell where transmission is commanded, based on received quality information (the CSI of each cell) transmitted from the user terminal 10. For example, the first radio base station apparatus 20A or the second radio base station apparatus 20B detects received quality transmitted from the user terminal 10 in the received quality information detection section 25, and has a cell selection section 24 that selects the cell to map downlink signals to, based on the received quality information. The cell selection section 24 commands mapping to be executed, to a cell (cell #1 or cell #2) where the received SINR is high, using received SINR information reported from the user terminal 10.

In this way, the present embodiment is configured such that part of the transmission control sections (for example, the retransmission control section) is shared between cells and the rest of the transmission processing sections (for example, the mapping section) are provided separately on a per cell basis, so that it is possible to effectively combine and apply carrier aggregation and the CoMP technique in a radio communication system where carrier aggregation is allowed in the same frequency band.

Now, a radio communication system 1 that is formed with user terminals 10 and radio base station apparatuses 20 will be described below with reference to FIG. 8. The user terminals 10 and the radio base station apparatuses 20 support LTE-A.

Figure 8:
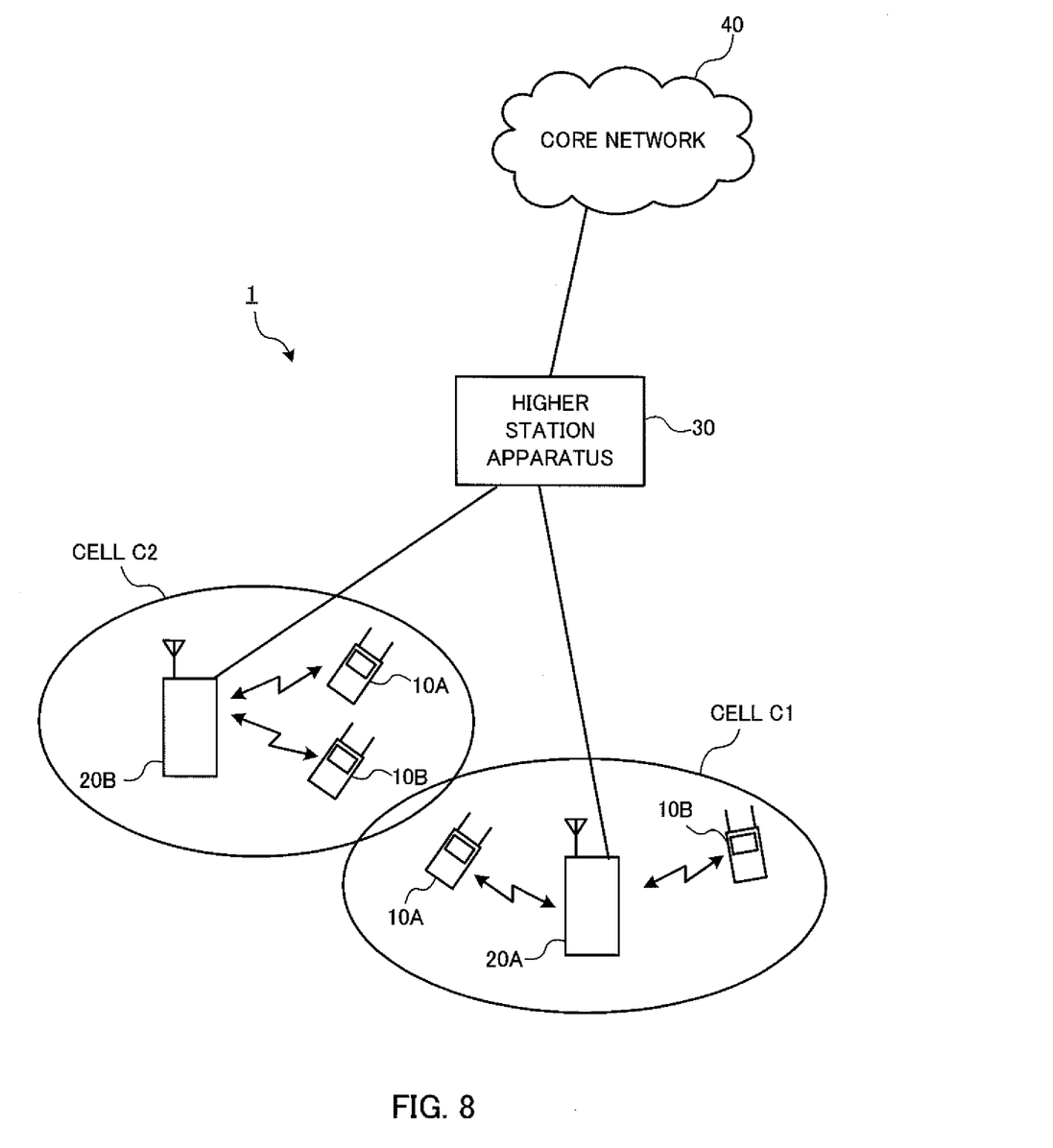
FIG. 8 is a diagram to explain a configuration of a radio communication system according to the present embodiment.

As shown in FIG. 8, the radio communication system 1 is configured to include radio base station apparatuses 20A and 20B, and a plurality of user terminals 10A and 10B that communicate with these radio base station apparatuses 20A and 20B. The radio base station apparatuses 20A and 20B are connected with a higher station apparatus 30, and the higher station apparatus 30 is connected with a core network 40. Also, the radio base station apparatuses 20A and 20B are connected with each other by wire connection or by wireless connection.

Also, in the radio communication system 1, carrier aggregation is allowed in the same frequency band, and the first radio base station apparatus 20A and the second radio base station apparatus 20B perform coordinated multiple point transmission, with the user terminals 10A and 10B, in cells where the frequency band is the same (cell C1 and cell C2). Cell C1 and cell C2 may have at least part of the coverage areas overlap, or the coverage area of one may include the coverage area of the other.

The user terminals 10A and 10B are able to communicate with the radio base station apparatuses 20A and 20B in cell 1 and cell 2, respectively. Note that the higher station apparatus 30 includes, for example, an access gateway apparatus, a radio network controller (RNC), a mobility management entity (MME) and so on, but is by no means limited to these.

Although the user terminals 10A and 10B may be either LTE terminals or LTE-A terminals, the following description will be given simply with respect to user terminals, unless specified otherwise.

In the radio communication system 1, as radio access schemes, OFDMA (Orthogonal Frequency Division Multiple Access) is adopted on the downlink, and SC-FDMA (Single-Carrier Frequency Division Multiple Access) is adopted on the uplink. Note that the uplink radio access scheme is by no means limited to this. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per user terminal, the system band into bands formed with one or continuous resource blocks, and allowing a plurality of terminals to use mutually different bands.

Here, the communication channels defined in LTE-A will be described. The downlink communication channels include a downlink data channel (PDSCH), which is used by the user terminals 10A and 10B on a shared basis, and downlink L1/L2 control channels (PDCCH, PCFICH, PHICH). Downlink data and higher control information are transmitted by the PDSCH. Downlink control information, such as scheduling information of the PDSCH and the PUSCH, and so on, are transmitted by the PDCCH. The number of OFDM symbols to use for the PDCCH is transmitted by the PCFICH (Physical Control Format Indicator Channel). HARQ ACK and NACK for the PUSCH are transmitted by the PHICH (Physical Hybrid-ARQ Indicator Channel).

The uplink communication channels include a PUSCH (Physical Uplink Shared Channel), which is used by the user terminals on a shared basis as an uplink data channel, and a PUCCH (Physical Uplink Control Channel), which is an uplink control channel. By means of this PUSCH, transmission data and higher control information are transmitted. Furthermore, the PUCCH transmits downlink channel quality information (CQI), ACK/NACK, and so on.

Figure 9:
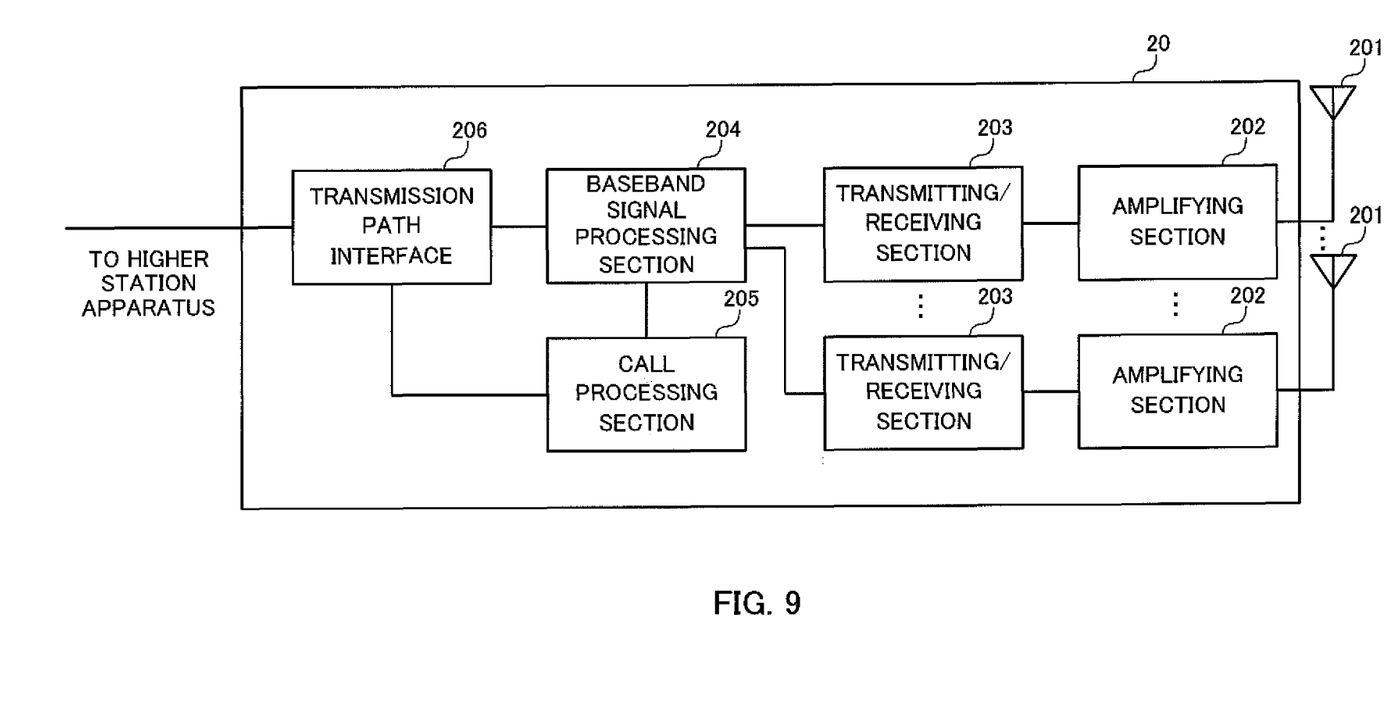
FIG. 9 is a functional block diagram to show an overall configuration of a radio base station apparatus according to the present embodiment.

Next, referring to FIG. 9, an overall configuration of a radio base station apparatus 20 according to the present embodiment will be described. Note that the first radio base station apparatus 20A and the second radio base station apparatus 20B could be made in the same overall configuration, and therefore will be described simply as "radio base station apparatus 20." Also, the user terminals 10A and 10B have the same configuration and therefore hereinafter will be described simply as "user terminal 10."

The radio base station apparatus 20 has a plurality of transmitting/receiving antennas 201, a plurality of amplifying sections 202, a plurality of transmitting/receiving sections 203, a baseband signal processing section 204, a call processing section 205, and a transmission path interface 206. Transmission data to be transmitted from the radio base station apparatus 20 to the user terminal 10 on the downlink is input from the higher station apparatus 30, into the baseband signal processing section 204, via the transmission path interface 206.

In the baseband signal processing section 204, a downlink data channel signal is subjected to PDCP layer processes, division and coupling of transmission data, RLC (Radio Link Control) layer transmission processes such as an RLC retransmission control transmission process, MAC (Medium Access Control) retransmission control, including, for example, a retransmission control (HARQ) transmission process, scheduling, transport format selection, channel coding, an inverse fast Fourier transform (IFFT) process, and a precoding process. Furthermore, as for the signal of the physical downlink control channel, which is a downlink control channel, transmission processes such as channel coding and an inverse fast Fourier transform are performed.

Also, the baseband signal processing section 204 reports control information for allowing each user terminal 10 to perform radio communication with the radio base station apparatus 20, to the user terminals 10 connected to the same cell, by a broadcast channel. Information for communication in the cell includes, for example, the system bandwidth on the uplink or the downlink, identification information of a root sequence (root sequence index) for generating signals of random access preambles of the PRACH (Physical Random Access Channel), and so on.

The transmitting/receiving sections 203 convert baseband signals, which have been subjected to precoding and output from the baseband signal processing section 204 per antenna, into a radio frequency band. The amplifying sections 202 amplify the radio frequency signals subjected to frequency conversion, and output the results by the transmitting/receiving antennas 201. Note that the transmitting/receiving sections 203 constitute a receiving section to receive CoMP candidate cell information and a transmission control section to transmit transmission power information, CoMP cell information and neighboring cell information and perform CoMP transmission of transmission signals.

On the other hand, as for the data to be transmitted from the user terminal 10 to the radio base station apparatus 20 on the uplink, radio frequency signals that are received in the transmitting/receiving antennas 201 are each amplified in the amplifying sections 202, converted into baseband signals by frequency conversion in the transmitting/receiving sections 203, and input in the baseband signal processing section 204.

The baseband signal processing section 204 performs an FFT process, an IDFT process, error correction decoding, a MAC retransmission control receiving process, and RLC layer and PDCP layer receiving processes, of the transmission data that is included in the baseband signals that have been input. The decoded signals are transferred to the higher station apparatus 30 through the transmission path interface 206. The call processing section 205 performs call processing such as setting up and releasing communication channels, manages the state of the radio base station apparatus 20 and manages the radio resources.

Figure 10:
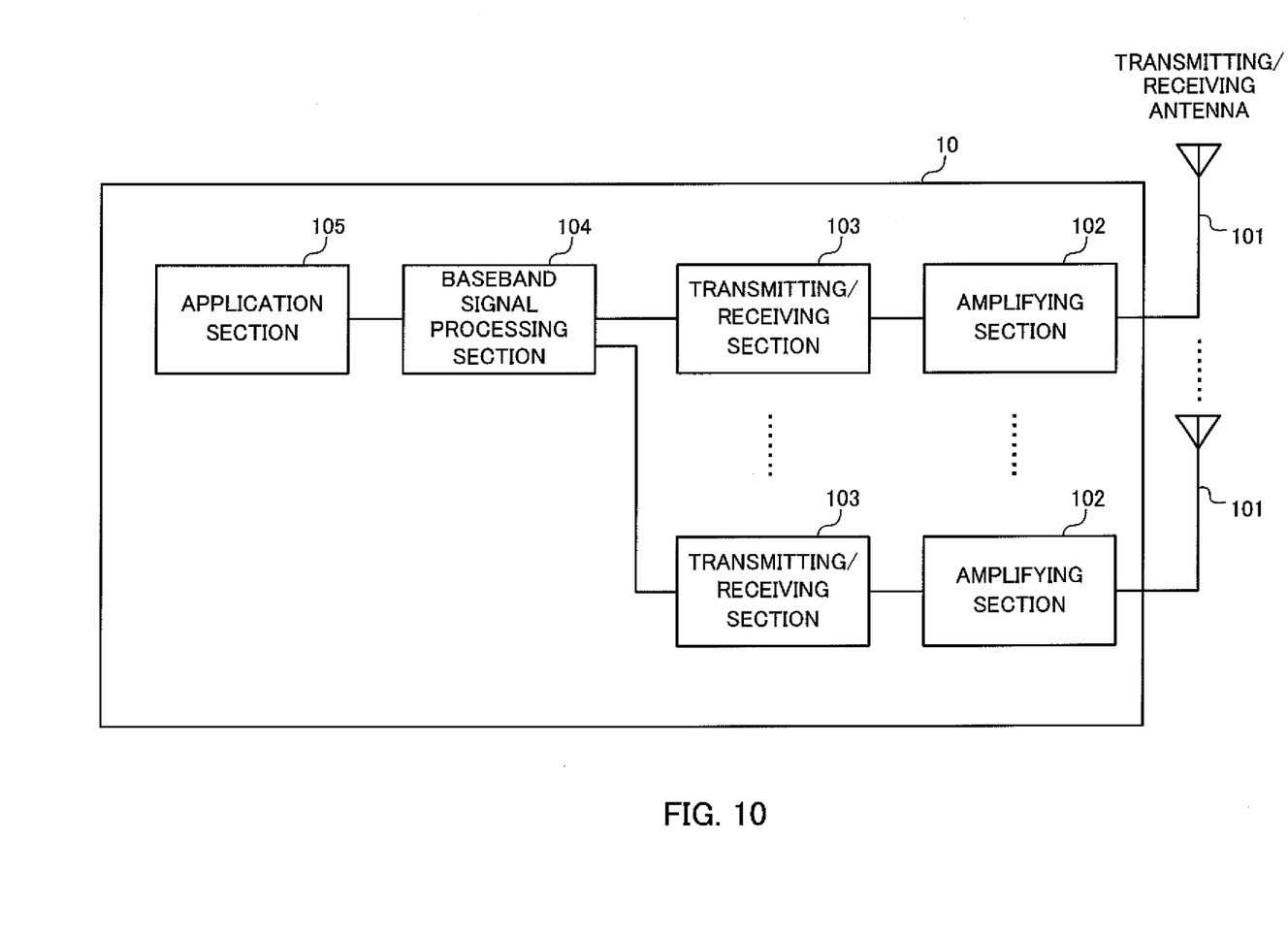
FIG. 10 is a functional block diagram to show an overall configuration of a user terminal according to the present embodiment.

Next, referring to FIG. 10, an overall configuration of a user terminal according to the present embodiment will be described. An LTE terminal and an LTE-A terminal have the same hardware configurations in principle parts, and therefore will be described indiscriminately. A user terminal 10 has a plurality of transmitting/receiving antennas 101, a plurality of amplifying sections 102, a plurality of transmitting/receiving sections 103, a baseband signal processing section 104, and an application section 105.

As for downlink data, radio frequency signals that are received in a plurality of transmitting/receiving antennas 101 are each amplified in the amplifying sections 102, and subjected to frequency conversion and converted into baseband signals in the transmitting/receiving sections 103. The baseband signals are subjected to receiving processes such as an FFT process, error correction decoding and retransmission control, in the baseband signal processing section 104. Downlink user data included in this downlink data is transferred to the application section 105. The application section 105 performs processes related to higher layers above the physical layer and the MAC layer. Also, broadcast information included in the downlink data is also transferred to the application section 105.

Meanwhile, uplink transmission data is input from the application section 105 to the baseband signal processing section 104. The baseband signal processing section 104 performs a mapping process, a retransmission control (HARQ) transmission process, channel coding, a DFT process, and an IFFT process. Also, a process of generating received quality information for each cell, to be reported to the radio base station apparatus 20, is performed. The baseband signals that are output from the baseband signal processing section 104 are converted into a radio frequency band in the transmitting/receiving sections 103, and, after that, amplified in the amplifying sections 102 and transmitted from the transmitting/receiving antennas 101.

Figure 11:
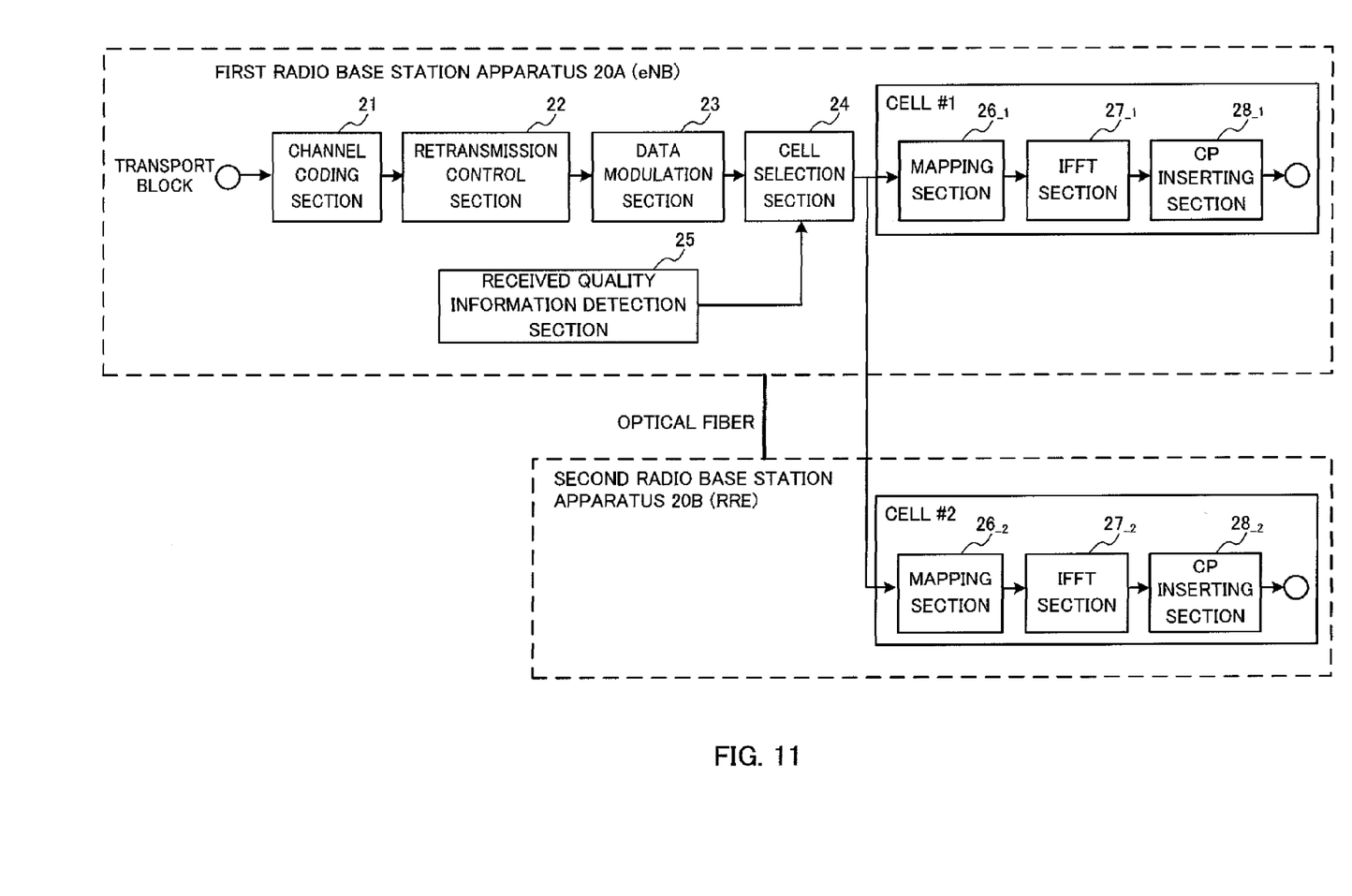
FIG. 11 is a functional block diagram to show a baseband processing section of a radio base station apparatus according to the present embodiment.

FIG. 11 is a functional block diagram of the baseband signal processing section 204 provided in the first radio base station apparatus 20A and the second radio base station apparatus 20B according to the present embodiment, and primarily shows function blocks for transmission processes in the baseband signal processing section 204.

Note that FIG. 11 shows, as an example, the first radio base station apparatus 20A (eNB) and the second radio base station apparatus 20B (RRE) that perform data transmission by an optical remote configuration. Also, a case is shown where the first radio base station apparatus 20A and the second radio base station apparatus 20B perform CoMP transmission/reception using cells (cell #1 and cell #2) of the same frequency band. Obviously, the number of radio base station apparatus 20 and the number of cells which each radio base station apparatus uses are not limited to these.

The first radio base station apparatus 20A (cell #1) and the second radio base station apparatus 20B (cell #2) perform transport block generation, retransmission control and data modulation, on a shared basis. Also, the mapping of downlink control signals and so on, the IFFT process and the CP insertion are controlled separately, on a per cell basis.

FIG. 11 shows a case where the channel coding section 21, the retransmission control section 22, and the data modulation section 23 are provided in the first radio base station apparatus 20A, and the mapping section 26, the IFFT section 27, and the CP inserting section 28 are provided in both of the first radio base station apparatus 20A and the second radio base station apparatus 20B. Obviously, it is possible to provide the channel coding section 21, the retransmission control section 22 and the data modulation section 23 in both of the first radio base station apparatus 20A and the second radio base station apparatus 20B, and control their processes on a shared basis between different cells.

The channel coding section 21, for example, performs channel coding of the downlink shared data channel (PDSCH) on a per user basis. The retransmission control section 22 generates retransmission control signals (ACK/NACK) in response to uplink signals transmitted from the user terminal 10. The data modulation section 23 modulates user data and so on having been subjected to channel coding, on a per user basis.

The mapping section 26 maps the modulated user data, downlink control signals and so on to radio resources. The IFFT section 27 performs an inverse fast Fourier transform of the downlink control signals, the downlink reference signals and so on, and converts the frequency domain signals into time domain signals. The CP inserting section 28 inserts cyclic prefixes in the time-sequence signal of the downlink control signals. Note that a cyclic prefix functions as a guard interval for cancelling the differences in multipath propagation delay. Transmission data, to which cyclic prefixes have been added, is transmitted to the transmitting/receiving sections 203.

Also, the first radio base station apparatus 20A has a cell selection section 24 that selects cells to map downlink control signals and so on to, when the dynamic cell selection method (DPS) is applied as coordinated multiple point transmission. The cell selection section 24 detects the received quality information (the CSI of each cell) transmitted from the user terminal 10, in the received quality information detection section 25, and, based on this received quality information, selects adequate cells.

A case will be described below where, in a radio communication system where carrier aggregation is applicable in the same frequency band, CoMP transmission to the user terminal 10 is performed using the first radio base station apparatus 20A (cell #1) and the second radio base station apparatus 20B (cell #2).

In a given transmission period T1, when the received quality in cell #1 is high, the cell selection section 24 selects cell #1. By this means, the user terminal 10 starts communicating with the first radio base station apparatus 20A. In the transmission period T1, the retransmission control section 22 of the first radio base station apparatus 20A (cell #1) generates a retransmission control signal (ACK/NACK) in response to an uplink signal transmitted from the user terminal 10. The user terminal 10 controls uplink signal retransmission based on the retransmission control signal fed back (transmitted) from the first radio base station apparatus 20A. Also, the mapping of downlink control signals and so on takes place in a mapping section 26_1 that is separately provided in the first radio base station apparatus 20A.

Following this, when, in the transmission period T2 after the transmission period T1, the received quality is higher in cell #2 than in cell #1, the cell selection section 24 selects cell #2. By this means, the user terminal 10 switches from the first radio base station apparatus 20A and starts communicating with the second radio base station apparatus 20B. At this time, the retransmission control signal in response to the signal transmitted from the user terminal 10 in the transmission period T1 is fed back to the user terminal 10 from the second radio base station apparatus 20B (cell #2), not from the first radio base station apparatus 20A (cell #1). Also, the mapping of downlink signals (control signals, data signals, reference signals and so on) takes place in a mapping section 26_2 that is separately provided in the second radio base station apparatus 20B.

In this way, by sharing the process in the retransmission control section 22 between cells, it is possible to transmit retransmission control signals generated in the retransmission control section 22 from either of the cell (cell #1) of the first radio base station apparatus 20A and the cell (cell #2) of the second radio base station apparatus 20B. By this means, even when the cell to communicate with the user terminal 10 changes upon CoMP transmission, it is possible to feed back retransmission control signals to the user terminal 10 without delay. Also, by controlling the mapping of downlink signals to radio resources in cell units, it is possible to take into account the multiplexing positions of control signals, reference signals and so on that are arranged differently on a per cell basis, so that mapping to adequate positions is possible.

Note that, although FIG. 11 shows a case to provide the first radio base station apparatus 20A as a radio base station apparatus eNB and the second radio base station apparatus 20B as remote radio equipment (RRE) in the configuration (centralized control based on a remote radio equipment configuration) shown in above FIG. 2A, it is equally possible to provide the present embodiment in the configuration (autonomous distributed control based on an independent base station configuration) shown in above FIG. 2B. For example, the first radio base station apparatus 20A and the second radio base station apparatus 20B may be provided as radio base station apparatus eNBs, and may be connected by an X2 interface. In this case, in FIG. 11, it is possible to provide a configuration in which the channel coding section 21, the retransmission control section 22 and the data modulation section 23 are provided in both of the first radio base station apparatus 20A and the second radio base station apparatus 20B and the processes of these are shared between different cells via the X2 interface.

Now, although the present invention has been described in detail with reference to the above embodiments, it should be obvious to a person skilled in the art that the present invention is by no means limited to the embodiments described herein. The present invention can be implemented with various corrections and in various modifications, without departing from the spirit and scope of the present invention defined by the recitations of the claims. Consequently, the descriptions herein are provided only for the purpose of explaining examples, and should by no means be construed to limit the present invention in any way.

The disclosure of Japanese Patent Application No. 2011-247490, filed on Nov. 11, 2011, including the specification, drawings, and abstract, is incorporated herein by reference in its entirety.

The invention claimed is:

1. A radio communication system where carrier aggregation is applicable in a same frequency band, the radio communication system comprising:
   a first radio base station apparatus and a second radio base station apparatus that perform coordinated multiple point transmission to a user terminal using cells of the same frequency band,
   wherein the first radio base station apparatus and the second radio base station apparatus execute retransmission control for uplink signals from the user terminal on a shared basis, and execute mapping of downlink signals to radio resources separately.

2. The radio communication system according to claim 1, wherein, when a dynamic cell selection method is applied as the coordinated multiple point transmission, the first radio base station apparatus or the second radio base station apparatus executes the mapping to a predetermined cell where transmission is commanded, based on received quality information that is transmitted from the user terminal.

3. A radio communication method in a radio communication system where carrier aggregation is applicable in a same frequency band, the radio communication method comprising the steps of:
   performing coordinated multiple point transmission by a first radio base station apparatus and a second radio base station apparatus to a user terminal using cells of the same frequency band; and
   receiving downlink signals from the first radio base station apparatus and the second radio base station apparatus by the user terminal,
   wherein the first radio base station apparatus and the second radio base station apparatus execute retransmission control for uplink signals from the user terminal on a shared basis, and execute mapping of downlink signals to radio resources separately.

4. The radio communication method according to claim 3, wherein, when a dynamic cell selection method is applied as the coordinated multiple point transmission, the first radio base station apparatus or the second radio base station apparatus executes the mapping to a predetermined cell where transmission is commanded, based on received quality information that is transmitted from the user terminal.

5. A radio base station apparatus that performs radio communication with a user terminal in a radio communication system where carrier aggregation is applicable in a same frequency band, the radio base station apparatus comprising:
   a transmission control section configured to perform coordinated multiple point transmission with another radio base station apparatus to a user terminal, using cells of the same frequency band;
   a retransmission control section configured to control retransmission acknowledgement in response to uplink signals from the user terminal; and
   a mapping section configured to map downlink signals, to radio resources, to transmit to the user terminal,
   wherein the retransmission control section is provided to be shared with the other radio base station apparatus, and the mapping section is provided separately from the other radio base station apparatus.

6. The radio base station apparatus according to claim 5, further comprising a cell selection section configured to, when a dynamic cell selection method is applied as the coordinated multiple point transmission, select a cell to perform mapping, based on received quality information that is transmitted from the user terminal.

7. A user terminal that performs radio communication with a plurality of radio base station apparatuses in a radio communication system where carrier aggregation is applicable in a same frequency band, the user terminal comprising:
   a reception control section configured to receive downlink signals that are given by coordinated multiple point transmission using cells of the plurality of radio base station apparatuses having a same frequency band; and
   a transmission control section configured to transmit received quality information,
   wherein the downlink signals include a retransmission control signal and downlink control signals, the retransmission control signal being generated in the plurality of radio base station apparatuses on a shared basis, and the downlink control signals being generated separately in each of the plurality of radio base stations.

* * * * *